(12) United States Patent
Hong

(10) Patent No.: US 7,581,630 B2
(45) Date of Patent: Sep. 1, 2009

(54) ROLLER DEVICE FOR A CONVEYER

(76) Inventor: Shih-An Hong, No. 24, Nan Kung 3rd Rd., Nankung Industrial Zone, Nan Tou City (TW)

( * ) Notice: Subject to any disclaimer, the term of this patent is extended or adjusted under 35 U.S.C. 154(b) by 0 days.

(21) Appl. No.: 12/009,778

(22) Filed: Jan. 22, 2008

(65) Prior Publication Data

US 2008/0190743 A1    Aug. 14, 2008

(30) Foreign Application Priority Data

Feb. 8, 2007    (TW) ............................... 96104601 A

(51) Int. Cl.
*B65G 13/00* (2006.01)
(52) U.S. Cl. ........................................ 193/37; 198/842
(58) Field of Classification Search .................. 193/37; 198/780, 835, 788, 789, 842
See application file for complete search history.

(56) References Cited

U.S. PATENT DOCUMENTS

| | | | | |
|---|---|---|---|---|
| 5,046,869 A | * | 9/1991 | Roberts et al. | 198/842 |
| 5,188,214 A | * | 2/1993 | Uttke et al. | 198/842 |
| 5,383,549 A | * | 1/1995 | Mayer | 198/842 |
| 6,082,528 A | * | 7/2000 | Habberley | 198/842 |
| 6,206,182 B1 | * | 3/2001 | Wilson et al. | 198/842 |
| 6,641,512 B2 | * | 11/2003 | Bryant et al. | 492/16 |

* cited by examiner

*Primary Examiner*—James R Bidwell
(74) *Attorney, Agent, or Firm*—Schwegman, Lundberg & Woessner, P.A.

(57) ABSTRACT

A weather-resistant roller device for a conveyer includes a roller body which has two axially opposite end walls respectively having indented wall regions each confining a receiving groove, a spindle supporting the roller body and having two engaging parts each projecting out of a respective end wall, bearing assemblies sleeved on the spindle, two anti-leak assemblies each provided in a respective receiving groove, and two protective caps each covering a respective engaging part. Each anti-leak assembly has an outer fixed seal member disposed annularly around the spindle and extending from the spindle to a respective indented wall region. Each protective cap has an inner skirt abutting sealingly against the outer fixed seal member of a respective anti-leak assembly, and a hollow neck extending outwardly from the inner skirt and receiving fittingly a respective engaging part.

6 Claims, 5 Drawing Sheets

US 7,581,630 B2

ROLLER DEVICE FOR A CONVEYER

BACKGROUND OF THE INVENTION

1. Field of the Invention

The invention relates to a roller device, more particularly to a roller device for a conveyer that is highly weather-resistant.

2. Description of the Related Art

Referring to FIG. 1, a currently available conveyer includes a support frame unit 1, a plurality of roller devices 2 mounted on the support frame unit 1, and a conveyor belt 3 supported by the roller devices 2. The support frame unit 1 has a bottom frame 101, and a plurality of support rods 102 fixed to the bottom frame 101. Each of the roller devices 2 has a spindle 201 positioned between two support rods 102, a roller body 202 sleeved on the spindle 201, two bearing assemblies (not shown) sleeved between the spindle 201 and the roller body 202, and two anti-leak units (not shown) sleeved respectively on outer sides of the bearing assemblies.

Although the aforementioned conveyer utilizes the anti-leak units to prevent dust and moisture from entering the roller body 202 of each roller device 2 so that the service life of the bearing assemblies is ensured and the normal operation of the conveyor belt 3 is maintained, when the conveyer is installed outdoors for use in conveying, for example, sandstone, salt, ore, etc., because of the bad environmental conditions that may be present, such as those encountered in seaside areas, where acid-base elements are present, two ends of the spindle 201 that are exposed on an outer portion of each roller body 202 are easily damaged due to corrosion, so that the service life of the spindle 201 is shortened.

U.S. Pat. No. 6,206,182 discloses a co-injected labyrinth and contact seal for an idler roller assembly for a belt conveyor background of the invention. The idler roller assembly includes a fixed shaft, a roller mounted for rotation about the shaft, and a housing mounted in each end which hub portion is disposed adjacent the housing. However, two opposite ends of the fixed shaft are exposed from the hub portion, and are thus easily damaged due to corrosion, so that the service life of the fixed shaft is similarly shortened.

SUMMARY OF THE INVENTION

Therefore, the object of the present invention is to provide a roller device for a conveyer that is highly weather-resistant so that the conveyer can be installed outdoors and the service life of the components thereof can be prolonged.

According to this invention, a weather-resistant roller device for a conveyer comprises a roller body, a spindle, bearing assemblies, two anti-leak assemblies, and two protective caps. The roller body has a tubular wall, and two axially opposite end walls connected to the tubular wall. The end walls respectively have indented wall regions each confining a receiving groove. The spindle supports the roller body, extends through the indented wall regions, and has two engaging parts of non-circular cross section projecting out of the end walls, respectively. The bearing assemblies are sleeved on the spindle. Each of the anti-leak assemblies is provided in a respective one of the receiving grooves, is disposed around the spindle, and has an outer fixed seal member disposed annularly around the spindle and extending from the spindle to one of the indented wall regions. Each of the protective caps covers one of the engaging parts of the spindle, and has an inner skirt abutting sealingly against the outer fixed seal member of one of the anti-leak assemblies, and a hollow neck extending outwardly from the inner skirt. The hollow neck has a non-circular cross section, and receives fittingly one of the engaging parts.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
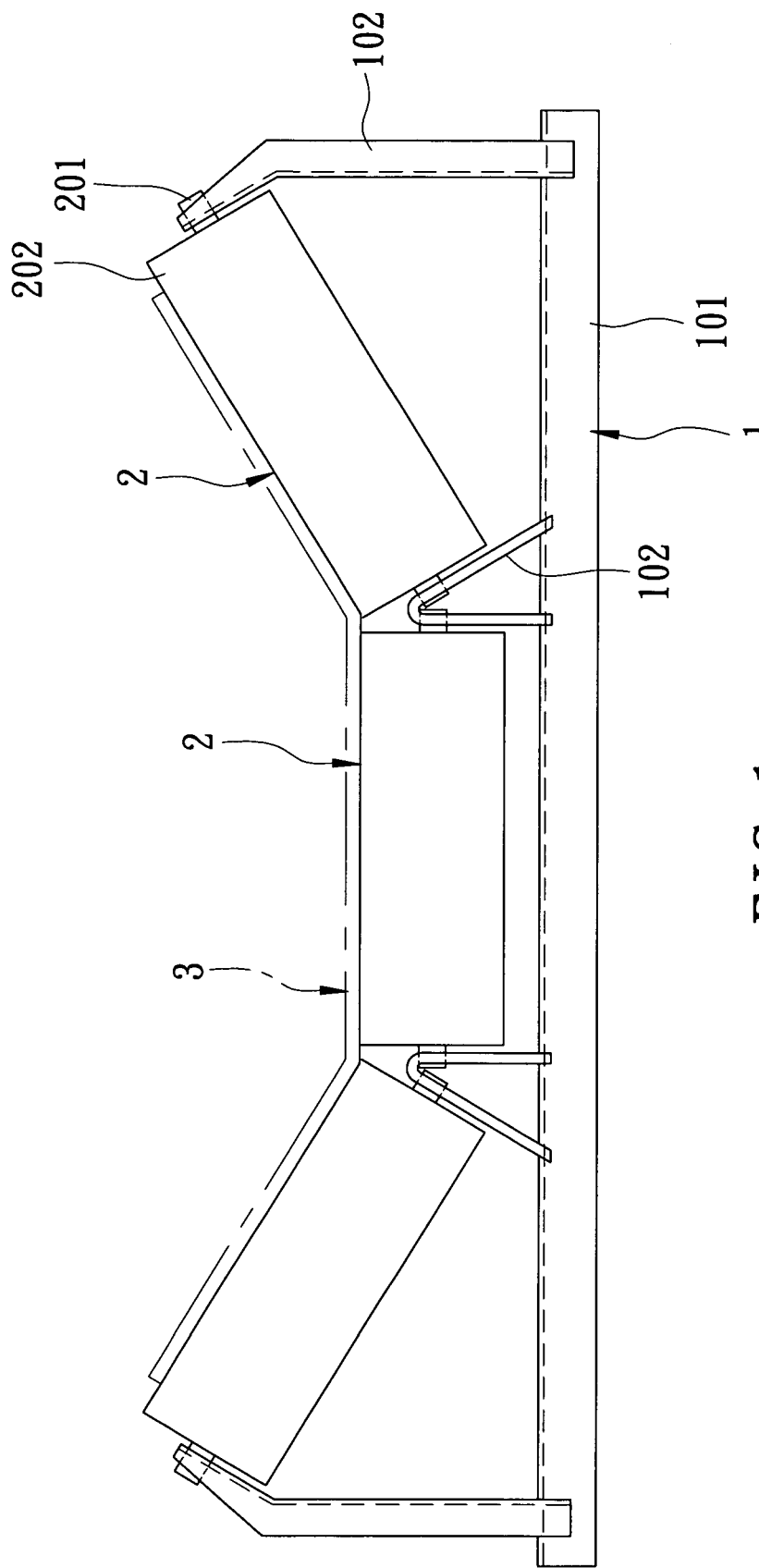
FIG. 1 is a schematic view of a currently available conveyer.

Referring to FIGS. 2 to 5, the preferred embodiment of a roller device 10 for a conveyer according to the present invention is shown to comprise a spindle 11, a roller body 20, two anti-leak assemblies 30, and two protective caps 40.

The spindle 11 is made of carbon steel, and has two opposite ends 111, two engaging parts 13 extending outwardly and respectively from the two opposite ends 111, and two annular engaging grooves 14 provided in an outer periphery of the spindle 11 and respectively proximate to the engaging parts 13. Each of the engaging parts 13 has a non-circular cross section. In this embodiment, each engaging part 13 has a substantially rectangular cross section.

The roller body 20 is made of plastic, and is sleeved on the spindle 11 so as to be supported by the same. In this embodiment, the roller body 20 is made of a fiber reinforced plastic (FRP) material. The roller body 20 has a tubular wall 21, and two axially opposite end walls 22 connected to the tubular wall 21. The end walls 22 respectively have indented wall regions 221 each confining a receiving groove 222. The receiving groove 222 has a small diameter groove section 2221, and a large diameter groove section 2222 extending outwardly from the small diameter groove section 2221 and proximate to a respective engaging groove 14. The spindle 11 extends through the indented wall regions 221 with the engaging parts 13 thereof projecting out of the end walls 22, respectively.

Bearing assemblies 12 are sleeved on the spindle 11 to support rotatably the roller body 20 on the spindle 11, and are respectively disposed in the small diameter groove sections 2221 of the receiving grooves 222 in the roller body 20.

The anti-leak assemblies 30 are respectively disposed in the large diameter groove sections 2222 of the receiving grooves 222 in the roller body 20. Each of the anti-leak assemblies 30 has an inner fixed seal member 31, an outer fixed seal member 32, and a movable seal member 33. The inner fixed seal member 31 is disposed around the spindle 11 proximate to a corresponding bearing assembly 12, and has an inner sleeve portion 311 sleeved fixedly and sealingly on the spindle 11, an inner disc portion 312 extending radially and outwardly from the inner sleeve portion 311 and having a free end 3121 proximate to a respective indented wall region 221, and a plurality of radially spaced-apart first annular ribs 313 projecting outwardly from the inner disc portion 312 and extending around the spindle 11.

The outer fixed seal member 32 has an outer sleeve portion 321 sleeved fixedly and sealingly on the spindle 11, a plurality of annularly spaced-apart flexible hooks 322 projecting from the outer sleeve portion 321 and engaging a corresponding engaging groove 14, a grooved portion 323 connected to the outer sleeve portion 321 and having an annular recess 324 surrounding the outer sleeve portion 321, an outer disc portion 325 extending radially and outwardly from the grooved portion 323 and having a free end 3251 proximate to a respective indented wall region 221, and a plurality of radially spaced-apart first annular ribs 326 projecting inwardly from the outer disc portion 325 and extending around the spindle 11.

The movable seal member 33 is disposed between the inner and outer fixed seal members 31, 32, and is fixed sealingly to the indented wall region 221 in the large diameter groove section 2222. The movable seal member 33 includes two opposite sides 331, 332 respectively facing the inner and outer disc portions 312, 325 and having a plurality of radially spaced-apart second annular ribs 333, 334.

The first and second annular ribs 313, 326, 333, 334 extend toward each other in such a manner that each of the first annular ribs 313, 326 extends between two adjacent ones of the second annular ribs 333, 334 without contacting each other to permit the movable seal member 33 to rotate relative to the inner and outer fixed seal members 31, 32. Due to the presence of the first and second annular ribs 313, 326, 333, 334, the inner and outer fixed seal members 31, 32 and the movable seal member 33 form a labyrinthine structure that provides protection against entry of contaminants into an interior of the roller device 10 via an open end of the respective receiving groove 222 in the roller body 20.

The protective caps 40 are made of plastic. In this embodiment, the protective caps 40 are made of a fiber reinforced plastic (FRP) material, and cover the engaging parts 13 of the spindle 11. In combination with FIG. 4, each of the protective caps 40 includes an inner skirt 41, a hollow neck 42, and an enlarged head portion 422. The inner skirt 41 abuts sealingly against a respective end 111 of the spindle 11 and the outer fixed seal member 32 of a respective anti-leak assembly 30, and has a stepped skirt wall having first and second annular shoulders 411, 412 and an annular insert end 413 inserted into the annular recess 324. Preferably, the annular insert end 413 tapers inwardly, and the annular recess 324 also tapers inwardly so as to complement with the annular insert end 413. The first and second annular shoulders 411, 412 abut against the outer fixed seal member 32 adjacent to the annular recess 324. The annular insert end 413 projects into the annular recess 324 between the first and second annular shoulders 411, 412, and surrounds the flexible hooks 322 so that the hooks 322 are engaged tightly to the corresponding engaging groove 14.

Figure 3:
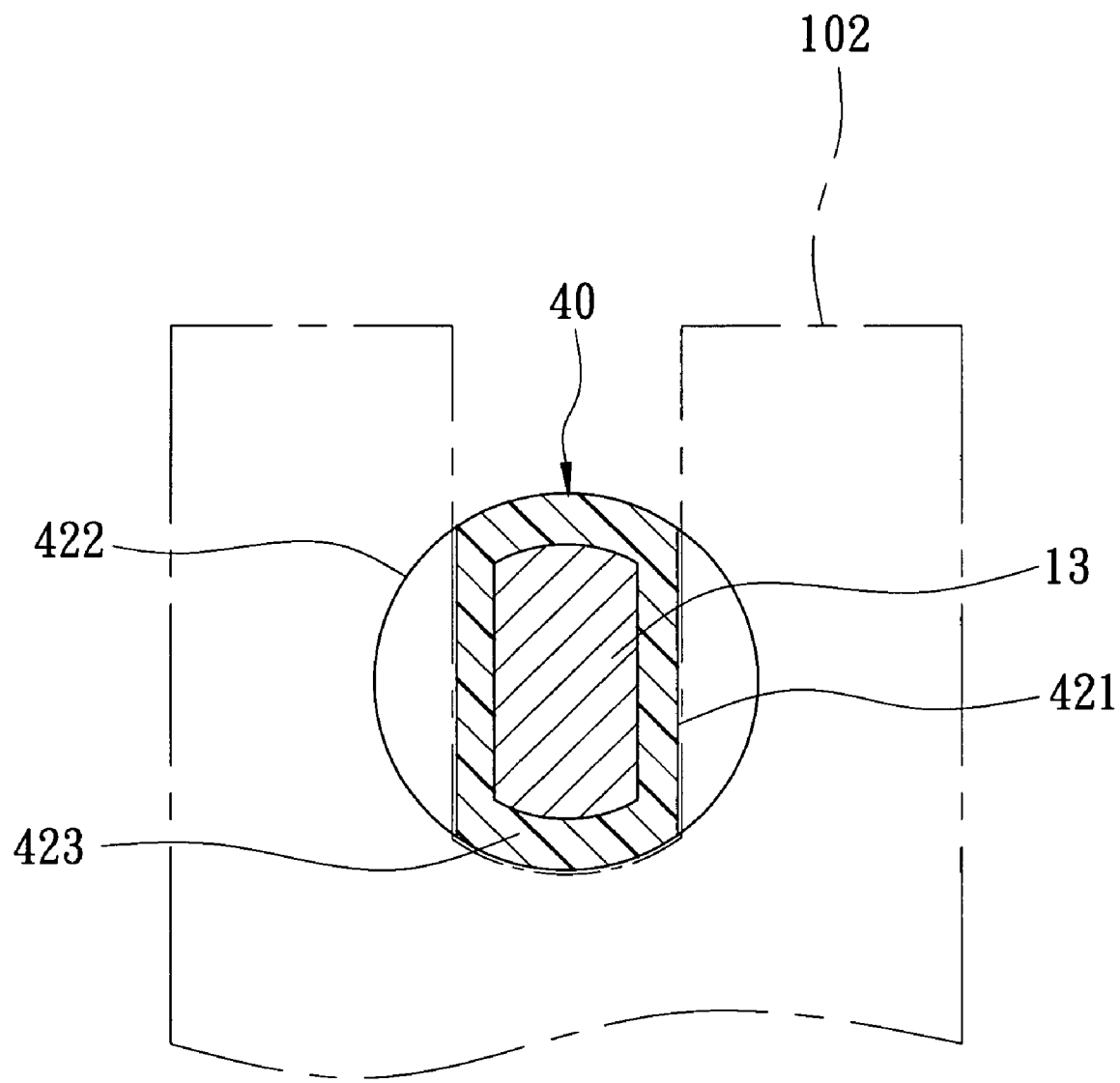
FIG. 3 is an enlarged sectional view of the preferred embodiment taken along line III-III of FIG. 2.
Figure 4:
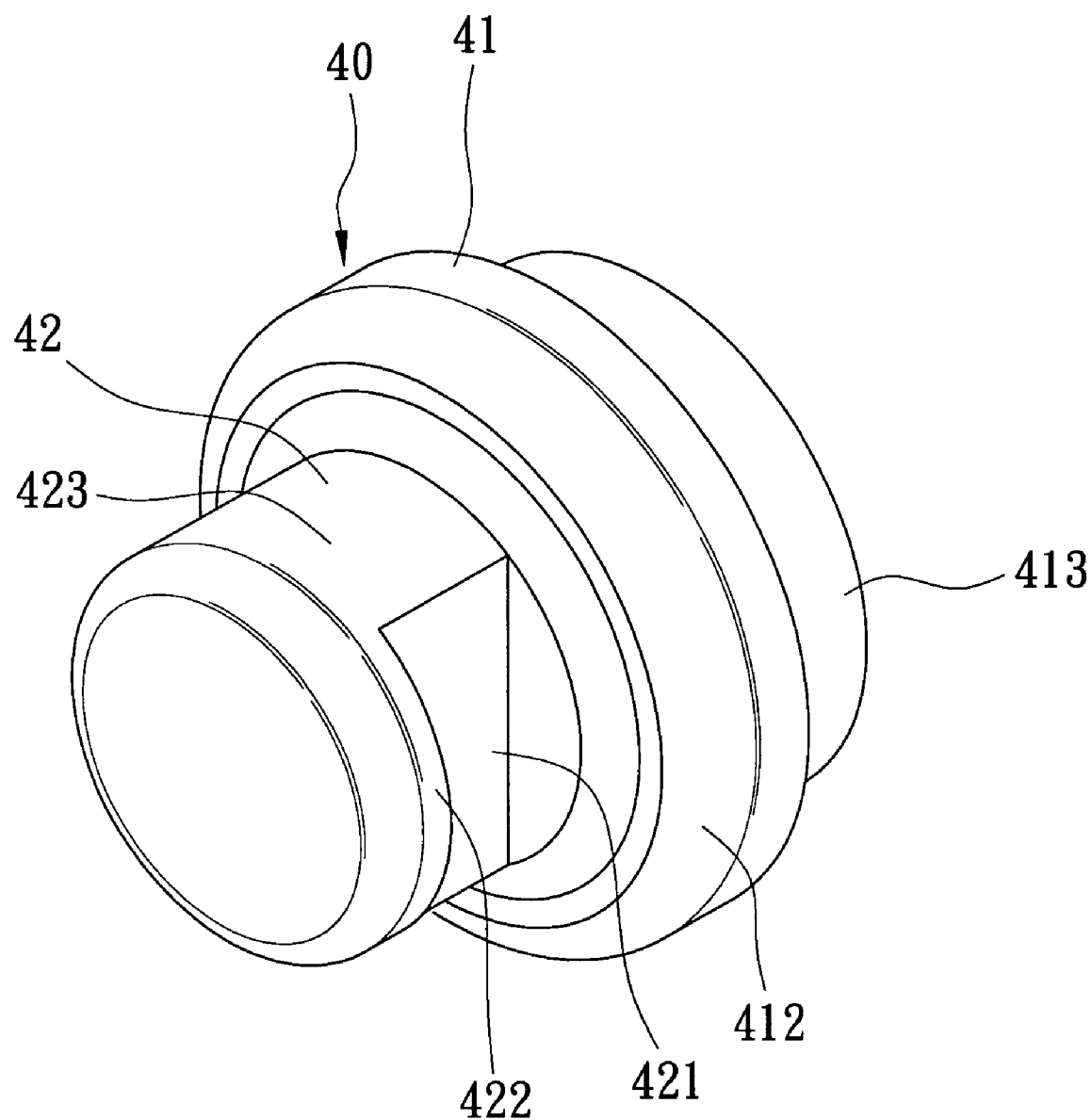
FIG. 4 is a perspective view of a protective cap of the preferred embodiment.

The hollow neck 42 extends outwardly from the inner skirt 41, and has a non-circular cross section. In this embodiment, the hollow neck 42 has a substantially rectangular cross section, and receives fittingly a respective engaging part 13 of the spindle 11. The hollow neck 42 has two diametrically opposed flat sides 421, and a mounting section 423 adapted to be inserted into a respective support rod 102 of the support frame unit 1, as shown in FIGS. 1 and 3. The enlarged head portion 422 extends outwardly from the hollow neck 42.

Figure 2:
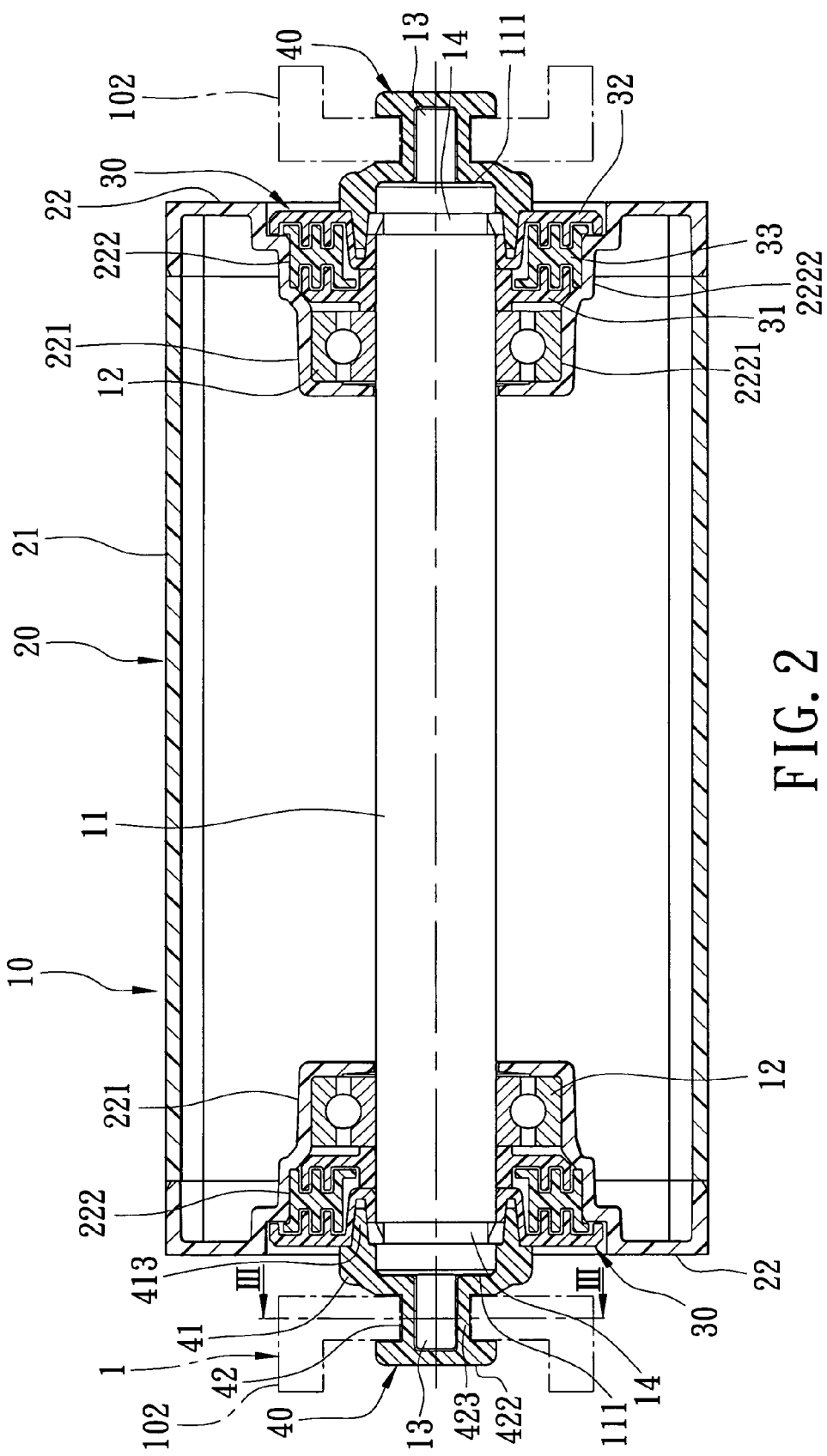
FIG. 2 is a sectional view of the preferred embodiment of a roller device for a conveyer according to the present invention.
Figure 5:
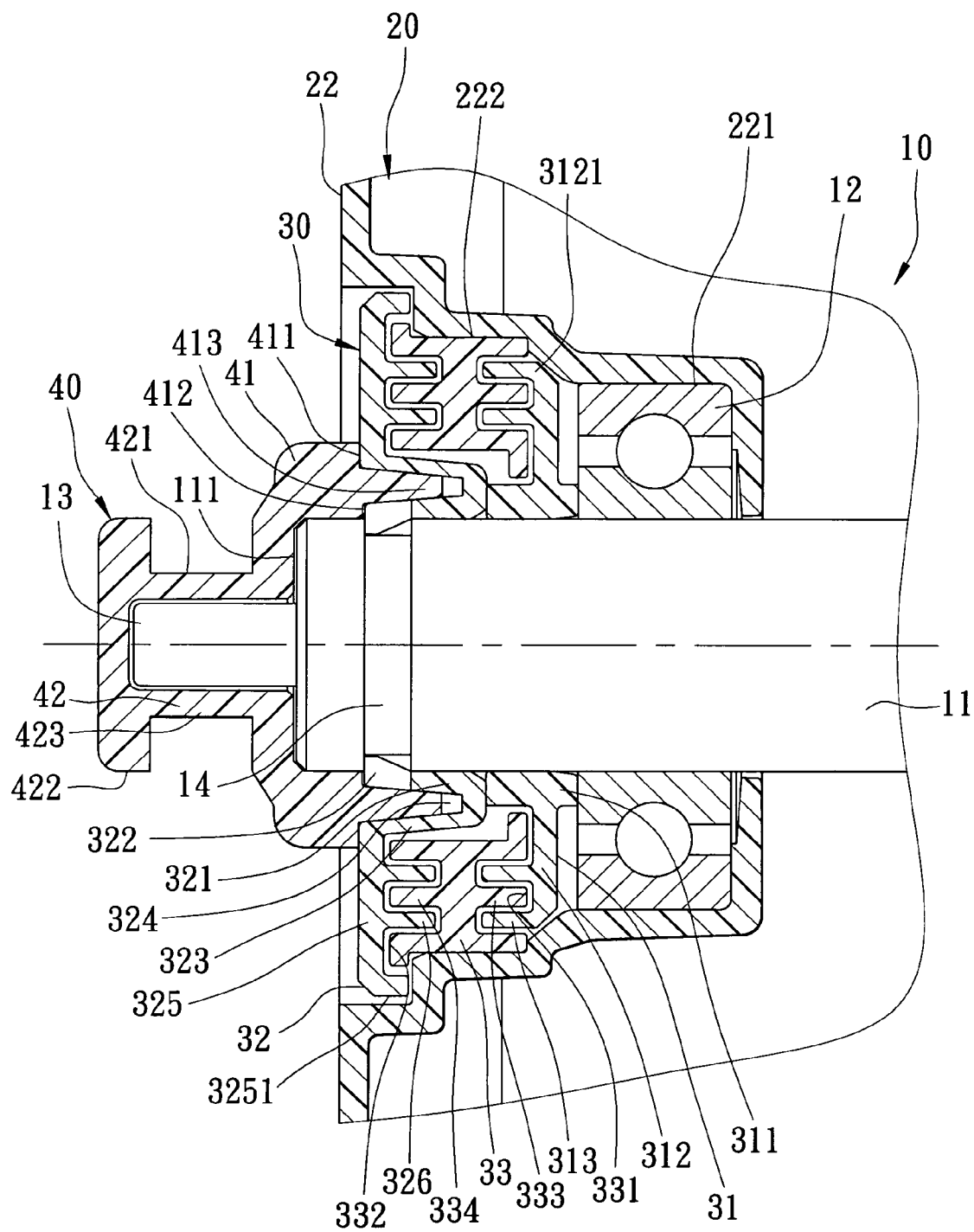
FIG. 5 is a fragmentary enlarged sectional view of the preferred embodiment, illustrating the protective cap sleeved on and covering an engaging part of a spindle.

With particular reference to FIGS. 2 and 5, after the entire roller device 10 is assembled, the roller body 20 can rotate smoothly relative to the spindle 11 through the bearing assemblies 12, and through cooperation of the annular ribs 333, 334 of the movable seal member 33 and the annular ribs 313, 326 of the inner and outer fixed seal member 31, 32. In addition, each anti-leak assembly 30 forms a labyrinthine structure that can prevent the entry of contaminants into the interior of the roller device 10 via the respective receiving groove 222. Further, through the presence of the protective caps 40 that respectively cover the engaging parts 13 of the spindle 11, the entire spindle 11 is prevented from corrosion due to unfavorable environmental conditions in which acid-base elements may be present in the surroundings, so that the spindle 11 is highly weather-resistant. Moreover, through the inner skirt 41 that abuts against the outer fixed seal member 32, and through the insert end 413 of the inner skirt 41 that is inserted into the annular recess 324 in the outer fixed seal member 32, connection between each protective cap 40 and the corresponding anti-leak assembly 30 can provide a good leak-proof effect, so that dust, water, and other contaminants can be prevented from entering the interior of the roller device 10, thereby prolonging the service life of the spindle 11, the bearing assemblies 12, and other components of the roller device 10.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A weather-resistant roller device for a conveyer, comprising:

a roller body having a tubular wall, and two axially opposite end walls connected to said tubular wall, said end walls respectively having indented wall regions each confining a receiving groove;

a spindle supporting said roller body and extending through said indented wall regions, said spindle having two engaging parts of non-circular cross section projecting out of said end walls, respectively; and bearing assemblies sleeved on said spindle;

said weather-resistant roller device being characterized by:

two anti-leak assemblies each provided in a respective one of said receiving grooves and disposed around said spindle, each of said anti-leak assemblies having an outer fixed seal member disposed annularly around said spindle and extending from said spindle to one of said indented wall regions; and two protective caps each of which covers one of said engaging parts of said spindle and each of which has an inner skirt abutting sealingly against said outer fixed seal member of one of said anti-leak assemblies, and a hollow neck extending outwardly from said inner skirt, said hollow neck having a non-circular cross section and receiving fittingly one of said engaging parts;

wherein each of said anti-leak assemblies further has an inner fixed seal member and a movable seal member both of which are disposed around said spindle, said outer and inner fixed seal members being fixed sealingly to said spindle, said movable seal member being disposed between said inner and outer fixed seal members and being fixed sealingly to said indented wall region of one of said end walls, said inner and outer fixed seal members respectively having radially spaced-apart first annular ribs extending around said spindle, said movable seal member including two opposite sides respectively facing said inner and outer fixed seal members and having a plurality of radially spaced-apart second annular ribs extending around said spindle, said first and second annular ribs extending toward each other in such a manner that each of said first annular ribs extends between two adjacent ones of said second annular ribs, whereby said inner and outer fixed seal members and said movable seal member form a labyrinthine structure that provides protection against entry of contaminants.

2. The weather-resistant roller device of claim 1, wherein each of said protective caps further has an enlarged head portion extending outwardly from the respective hollow neck thereof.

3. The weather-resistant roller device of claim 1, wherein each of said protective caps is made of a fiber reinforced plastic (FRP) material.

4. A weather-resistant roller device for a conveyer, comprising:
   a roller body having a tubular wall, and two axially opposite end walls connected to said tubular wall, said end walls respectively having indented wall regions each confining a receiving groove;
   a spindle supporting said roller body and extending through said indented wall regions, said spindle having two engaging parts of non-circular cross section projecting out of said end walls, respectively; and
   bearing assemblies sleeved on said spindle;
   said weather-resistant roller device being characterized by:
   two anti-leak assemblies each provided in a respective one of said receiving grooves and disposed around said spindle, each of said anti-leak assemblies having an outer fixed seal member disposed annularly around said spindle and extending from said spindle to one of said indented wall regions; and
   two protective caps each of which covers one of said engaging parts of said spindle and each of which has an inner skirt abutting sealingly against said outer fixed seal member of one of said anti-leak assemblies, and a hollow neck extending outwardly from said inner skirt, said hollow neck having a non-circular cross section and receiving fittingly one of said engaging parts;
   wherein said spindle further has two annular engaging grooves proximate to said engaging parts, respectively, said outer fixed seal member further having a sleeve portion sleeved on said spindle, and a plurality of annularly spaced-apart flexible hooks projecting from said sleeve portion and engaging a respective one of said annular engaging grooves;
   wherein said outer fixed seal member further has an annular recess surrounding said sleeve portion, said inner skirt of each of said protective caps having an annular insert end inserted into said annular recess; and
   wherein said inner skirt of each of said protective caps includes a stepped skirt wall having said annular insert end, said stepped skirt wall further having first and second annular shoulders abutting against said outer fixed seal member adjacent to said annular recess, said annular insert end projecting into said annular recess between said first and second annular shoulders.

5. The weather-resistant roller device of claim 4, wherein each of said protective caps further has an enlarged head portion extending outwardly from the respective hollow neck thereof.

6. The weather-resistant roller device of claim 4, wherein each of said protective caps is made of a fiber reinforced plastic (FRP) material.

* * * * *